(12) United States Patent
Sato (10) Patent No.: US 6,733,317 B2
(45) Date of Patent: May 11, 2004

(54) RECORDING APPARATUS

(75) Inventor: Noriko Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/368,616

(22) Filed: Feb. 20, 2003

(65) Prior Publication Data

US 2003/0162429 A1 Aug. 28, 2003

(30) Foreign Application Priority Data

Feb. 28, 2002 (JP) .......................................... 2002-053425

(51) Int. Cl.[7] .............................................. H01R 13/64
(52) U.S. Cl. ...................................................... 439/246
(58) Field of Search .............................. 439/246, 247, 439/248

(56) References Cited

U.S. PATENT DOCUMENTS

| | | | | |
|---|---|---|---|---|
| 3,094,364 A | * | 6/1963 | Lingg ........................ | 439/247 |
| 4,909,748 A | * | 3/1990 | Kozono et al. .............. | 439/247 |
| 4,978,313 A | * | 12/1990 | Kameyama et al. ......... | 439/248 |
| 5,392,371 A | * | 2/1995 | Morlion et al. ............... | 385/52 |
| 5,936,740 A | * | 8/1999 | Fukazawa et al. ........... | 358/296 |
| 2002/0130923 A1 | * | 9/2002 | Sato ............................. | 347/37 |

FOREIGN PATENT DOCUMENTS

| | | |
|---|---|---|
| EP | 0 482 775 | 4/1992 |
| JP | 5-16339 | 1/1993 |

* cited by examiner

*Primary Examiner*—Tulsidas Patel
(74) *Attorney, Agent, or Firm*—Fitzpatrick, Cella, Harper & Scinto (57) ABSTRACT

The present invention aims to enhance reliability regarding connection between electrical connection portions of a recording head and a head holding member and to enhance positioning accuracy of the recording head with respect to the head holding member. To this end, a recording apparatus according to the present invention includes a connector holding portion for supporting a card edge substrate to be mounted and dismounted with respect to a card edge connector through an elastic member so that the card edge substrate can be moved in two directions perpendicular to mounting and dismounting directions thereof.

18 Claims, 4 Drawing Sheets

RECORDING APPARATUS

DESCRIPTION OF THE INVENTION

1. Field of the Invention

The present invention relates to a recording apparatus having a head holding member for detachably holding a recording head.

2. Related Background Art

Regarding recording apparatuses, a recording apparatus of a so-called serial type, in which a recording head is mounted on a carriage and the recording is carried out by reciprocally scanning the carriage in a direction perpendicular to a conveying direction of a recording medium, has recently come into widespread use. The reason is that the recording apparatus of the serial type can form an image with a recording head smaller in comparison with a recording area, thereby facilitating compactness and cost reduction of the recording apparatus. In the recording apparatus of the serial type, since electrical connection between the recording head on the carriage and control means of a main body of the recording apparatus must be maintained even when the carriage is being moved, the recording means and the recording head are interconnected by a flexible cable having flexibility and the like.

The electrical connection between the flexible cable and the recording head is performed by using the soldering, insertion into a cable connector, or pressure abutment by means of a pressure abutment connector or a rubber pad.

For example, Japanese Patent Application Laid-open No. 5-016339 (1993) discloses an example in which a cable connector is used. In this example, after a recording head is previously mounted to a carriage positively, by moving a cable connector by means of an operation lever, the cable connector is inserted into a connector. However, in this method, not only a user's operation for attaching recording head is complicated, but also, since positional deviation due to dimensional tolerance between a plurality of recording heads arranged and connectors connected to the respective heads is absorbed by elasticity of electrical wiring terminals, reliability of electrical connection is doubtful.

Also in the connection using the soldering, positioning and securing of the recording heads to the recording apparatus must be performed independent of the electrical connection, and the recording heads once attached cannot be dismounted, so that the user cannot use other kind of heads and, if the recording head is damaged, such a head cannot be exchanged.

Thus, in recording apparatuses in which the recording head is mounted and dismounted by the user, a pressure abutment system using a pressure abutment connector or a rubber pad, in which the electrical connection is achieved by abutting the recording head against an electrical connection portion of the recording apparatus has widely been used. In the pressure abutment system, by widening an area of the pressure abutment pad or by lengthening a pressure abutment stroke, a slight degree of freedom can be given to a relative position between an electrical contact terminal of the recording apparatus and an electrical contact terminal of the recording head. By doing so, the recording head can be positioned and secured with respect to a head holding member for holding the recording head with high accuracy and at the same time the electrical contacts can abut against each other, with the result that attachment of the recording head can be completed with an easy operation.

The recording apparatus using the pressure abutment system utilizing the pressure abutment connector or the rubber pad has an urging member having a strong urging force in order to maintain electrical communication by abutting the electrical contacts against each other strongly. Thus, when the electrical contacts are interconnected, the abutment surface may be deformed due to high reaction forces acting on the urging member and the head holding member to separate the electrical contacts from each other. To avoid this, these members must be reinforced sufficiently. Further, in order to maintain a condition that the high stress acts on these members during the operation of the recording apparatus, peripheral members such as the urging member must be formed from metal, or, when such members are formed from resin, ribs are added to increase the strength and to avoid deformation due to stress.

Further, in the recording apparatus using the pressure abutment system, since the positioning and securing of the recording head is performed by applying the strong urging force to the electrical connection portion in this way, the attachment of the recording head requires a great operating force, with the result that user's operability may be worsened. To avoid this, there has been proposed a technique in which, by providing an attaching lever, the user's operating position is located remote from the pressure abutment position between the electrical contacts so that the user's operating force is reduced by utilizing the principle of "lever".

In this way, since the recording apparatus using the pressure abutment system requires the provision of the urging member and the attaching lever, and, thus, a wide space is required around the contact terminals, there arose a problem that it was difficult to make the recording apparatus compact. Further, as the recording speed and image quality of the recording apparatus increased, the number of the electrical contacts themselves increased, with the result that, even in a large recording apparatus, which need not be made compact, there arose a problem regarding reduction in stress and operating force of the electrical connection portion.

SUMMARY OF THE INVENTION

An object of the present invention is to provide a recording apparatus in which, when a recording head is mounted to a head holding member to connect an electrical connection portion of the recording head to an electrical connection portion of the head holding member, reliability regarding connection between the electrical connection portions can be enhanced, and positioning accuracy of the recording head with respect to the head holding member can be enhanced.

Another object of the present invention is to provide a recording apparatus in which a recording head is detachably held by a head holding member so that electrical connection portions of the recording apparatus and the head holding member are interconnected and in which an attachment portion between the recording head and the head holding member can be made compact and, further, a user's operation for mounting and dismounting the recording head with respect to the head holding member can be facilitated.

A further object of the present invention is to provide a recording apparatus comprising a head holding member for detachably holding a recording head to which a card edge substrate having a plurality of electrical contacts to which drive signals are transmitted is attached and which serves to perform a recording operation on the basis of the drive signals, and a card edge connector having plurality of electrical contact terminals connected to the plurality of electrical contacts of the card edge substrate respectively and attached to the head holding member, and in which the head holding member has a connector holding portion for supporting the card edge connector through an elastic member so that the card edge connector can be moved in two directions perpendicular to mounting and dismounting directions of the card edge substrate with respect to the card edge connector.

The other object of the present invention is to provide a recording apparatus comprising a head holding member for detachably holding a recording head to which a card edge connector having a plurality of electrical contact terminals to which drive signals are transmitted is attached, and a card edge substrate which has a plurality of electrical contacts connected to the plurality of electrical contact terminals of the card edge connector respectively and which is attached to the head holding member, and in which the recording head has a connector holding portion for supporting the card edge connector through an elastic member so that the card edge connector can be moved in two directions perpendicular to mounting and dismounting directions of the card edge substrate with respect to the card edge connector.

BRIEF DESCRIPTION OF THE DRAWINGS

FIGS. 3A, 3B and 3C are schematic views showing a holding structure of a connector holding portion for holding a card edge connector, where FIG. 3A is a top view of the holding structure.

DETAILED DESCRIPTION OF THE PREFERRED EMBODIMENTS

The present invention will now be fully explained in connection with embodiments thereof with reference to the accompanying drawings.

Figure 1:
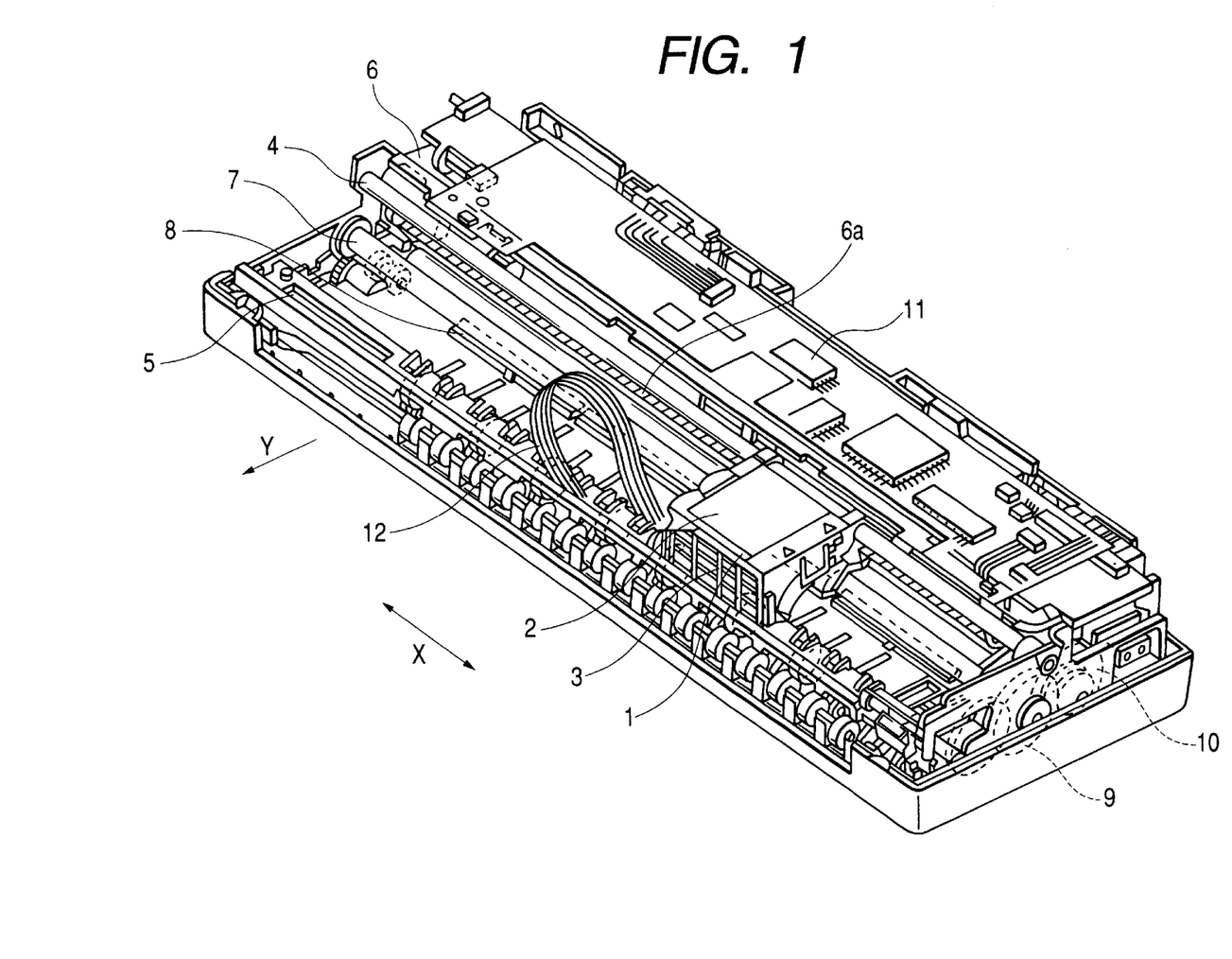
FIG. 1 is a perspective view showing an entire recording apparatus according to an embodiment of the present invention.

FIG. 1 is a perspective view showing an entire recording apparatus according to an embodiment of the present invention. The recording apparatus shown in FIG. 1 is a general recording apparatus of the serial type in which a character, a symbol, an image or the like are formed on a recording sheet (recording medium) such as a recording paper, a special paper or an OHP film by selectively discharging ink from a recording head to adhere the ink onto the recording sheet synchronously with repetition of a reciprocal movement (main scanning) of the recording head 1 in a main scanning direction and conveyance (sub scanning) of the recording sheet with a predetermined pitch in a sub scanning direction.

As shown in FIG. 1, the recording head 1 is detachably mounted to and held by a carriage 3 as a head holding member, together with an ink tank 2 containing ink used for image formation. The carriage 3 is movably guided only in directions (main scanning direction) shown by the double-headed arrow X in FIG. 1 by a guide shaft 4 and a guide rail 5 both fixed within the recording apparatus. The carriage 3 is driven by a CR motor 6 as drive means through a carriage belt 6a to thereby carry out reciprocal scanning. Thus, the guide shaft 4, the guide rail 5, the CR motor 6 and the carriage belt 6a constitute scanning means for carrying out the reciprocal scanning of the carriage 3.

A recording medium (not shown) on which recording is effected by the recording head 1 is pinched between an LF roller 7 and a pinch roller 8 which are rotatably attached within the recording apparatus and is conveyed in a direction (sub scanning direction) shown by the arrow Y perpendicular to a direction shown by the arrow X by rotatingly driving the LF roller by an LF motor 10 through an LF gear 9.

A control substrate 11 is attached within the recording apparatus. A control circuit provided as control means on the control substrate 11 serves to produce control signals to the recording head 1, the CR motor 6 and the LF motor 10 to control their operations. Since the recording head 1 and the control substrate 11 are electrically interconnected to establish electrical communication therebetween by a flexible cable 12 as signal transmitting means, transmission of the control signal between the recording head and the control substrate 1 is carried out through the flexible cable 12 even during the scanning operation of the recording head 1 in the direction shown by the arrow X.

The recording head 1 is provided with a plurality of nozzle arrays corresponding to respective colors and the recording is carried out by discharging ink droplets from respective nozzles constituting the nozzle arrays. Further, in the recording head 1, a plurality of heat generating resistance bodies as electrical/thermal converting elements corresponding to the respective nozzles are formed as energy generating means for generating discharging energy applied to the ink in the nozzle to discharge the ink droplet from the nozzle. The drive signal for driving the recording head 1 is transmitted from the control substrate 11 to the recording head 1 through the flexible cable 12 and electrical connection portions attached to the recording head 1 and the flexible cable 12, and, on the basis of the drive signal, the ink droplet is discharged from the nozzle of the recording head 1.

Figure 2A:
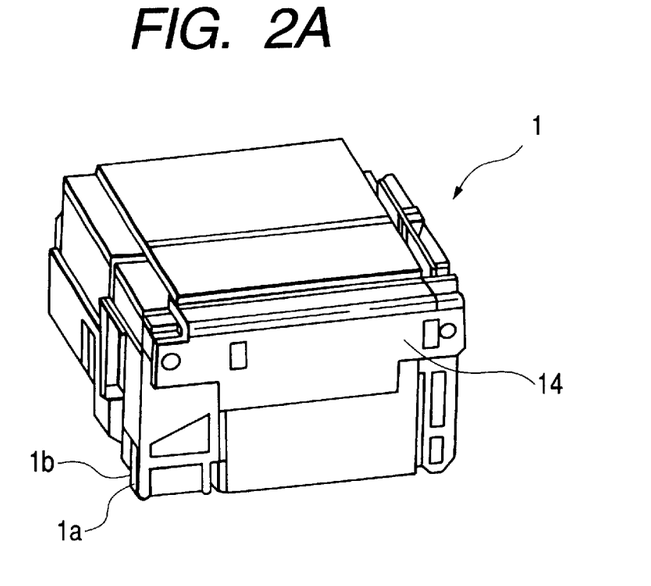
FIG. 2A is a perspective view showing a rear surface side of a recording head shown in FIG. 1.
Figure 2B:
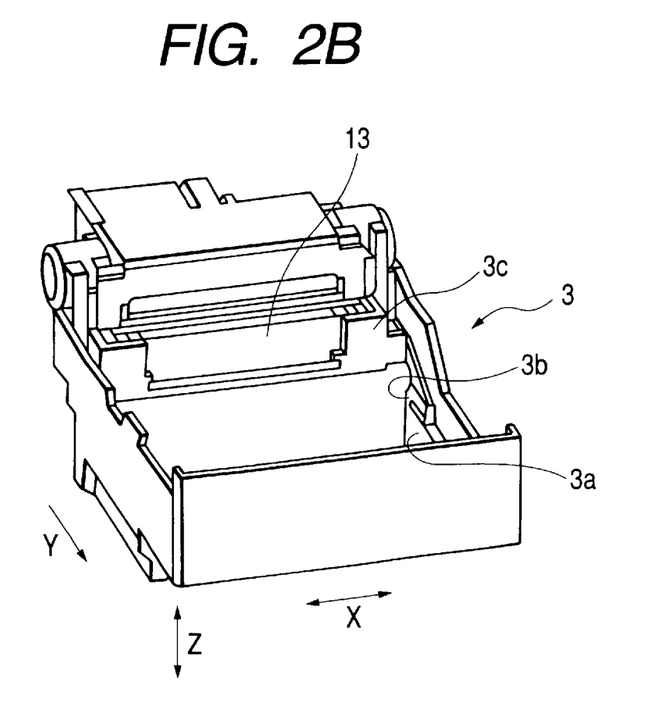
FIG. 2B is a perspective view showing a front surface side of a carriage shown in FIG. 1.

FIG. 2A is a perspective view showing a rear surface side of the recording head shown in FIG. 1 and FIG. 2B is a perspective view showing a front surface side of the carriage shown in FIG. 1. Accordingly, the recording head 1 is mounted to the carriage 3 rotated by 180 degrees in an XY plane of FIG. 2B so that a card edge substrate 14 is inserted into a card edge connector 13.

The recording head 1 is provided at its end with the card edge substrate 14, and the drive signals are transmitted to the nozzle arrays through a wiring member (not shown). The card edge substrate 14 is a plug portion in which a conductor pattern is formed on an end portion of a wiring substrate of the recording head 1 and is integrally secured to a frame of the recording head 1.

The carriage 3 is provided at its upper surface with an opening portion through which the recording head 1 is inserted into an internal space of the carriage 3 from an upper side of the carriage 3. That is to say, by pushing the recording head 1 into the internal space of the carriage 3 along a direction Z perpendicular to both directions X and Y, the recording head 1 is mounted to the carriage 3.

Within the carriage 3, there are provided an X direction positioning surface 3a for defining a position of the recording head 1 in the scanning direction, and a Y direction positioning surface 3b for defining a position in the sub scanning direction. On the other hand, the recording head 1 is also provided with X and Y direction positioning surfaces 1a and 1b corresponding to the positioning surfaces 3a and 3b of the carriage 3.

The recording apparatus according to the illustrated embodiment includes carriage position detecting means provided on the carriage 3, and a driving force from the CR motor 6 is transmitted to the carriage 3 through driving force transmitting means (not shown) to control the scanning of the carriage 3, and, synchronously with this, the driving signal is transmitted to the recording head 1. Thus, in order to achieve high fine image recording, it is important that the carriage 3 and the recording head 1 are positioned relatively with high accuracy. When the recording head 1 is attached to the carriage 3, in order to abut the positioning surfaces against each other positively and to prevent other parts from obstructing such abutment, it is desirable that an inner dimension of the carriage 3 be greater than an outer dimension of the recording head 1 by 1 mm or less in the X and Y directions.

Within the carriage 3, the card edge connector 13 by which the card edge substrate 14 is engaged is attached so that it can be moved with respect to a connector holding portion 3c of the carriage 3 in the X and Y directions. The card edge connector 13 has a rectangular configuration with long sides extending in the X direction and short sides extending in the Y direction, and the card edge connector 13 is provided at its upper surface with a card insertion opening 13a (refer to FIGS. 3A and 3B) into which the card edge substrate 14 is inserted. Edges of the card insertion opening 13a are chamfered as chamfers 13d (refer to FIGS. 3A and 3B) of 0.5 mm or more in both X and Y directions. An end of the flexible cable 12 (refer to FIG. 1) is soldered to a rear surface of the card edge connector 13. The card edge connector 13 and the flexible cable 12 constitute signal transmitting means for transmitting the drive signals from the control substrate 11 to the recording head 1 on the carriage 3.

Figure 3A:
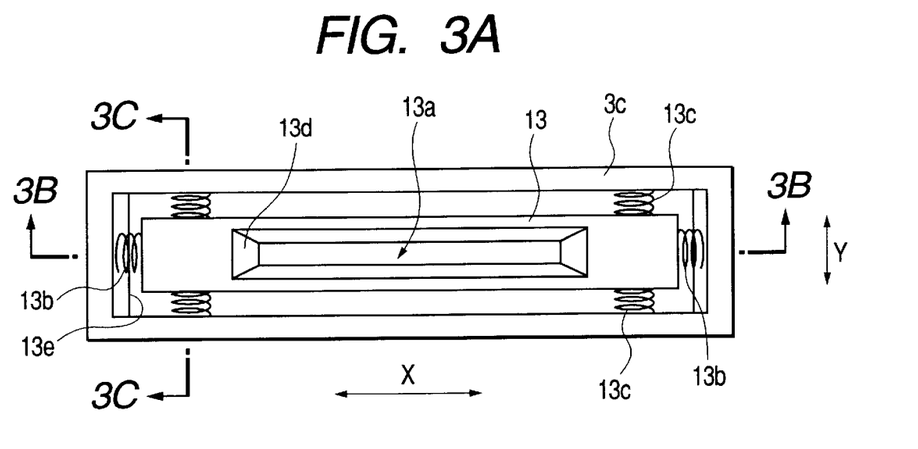
Figure 3B:
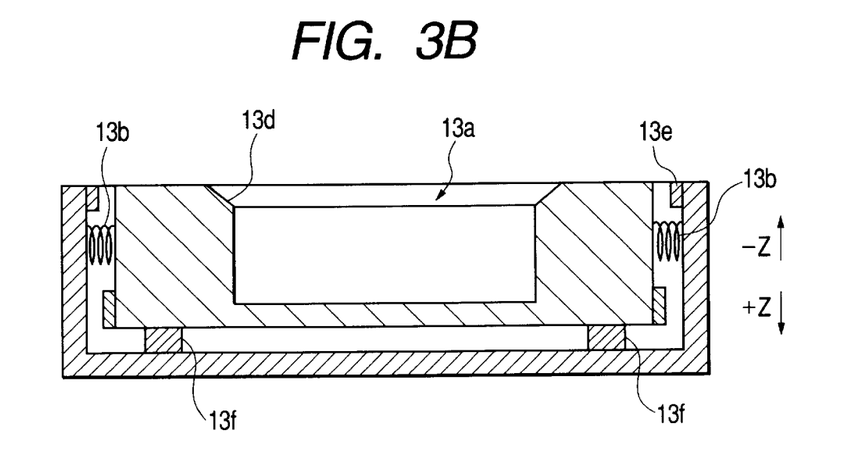
FIG. 3B is a sectional view taken along the line 3B—3B in FIG. 3A
Figure 3C:
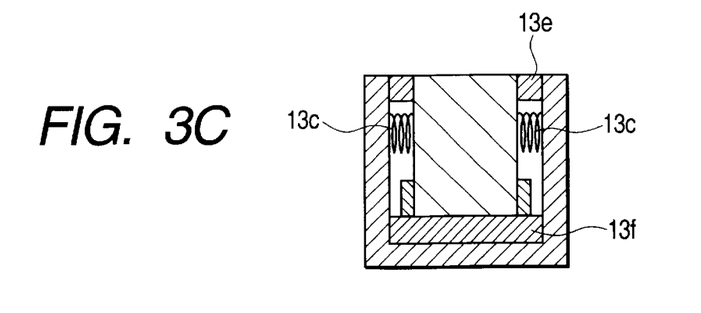
FIG. 3C is a sectional view taken along the line 3C—3C in FIG. 3A.

FIGS. 3A to 3C are schematic views showing a holding structure of the connector holding portion for the card edge connector, where FIG. 3A is a top view of the structure, FIG. 3B is a sectional view taken along the line 3B—3B in FIG. 3A and FIG. 3C is a sectional view taken along the line 3C—3C in FIG. 3A.

Figure 4:
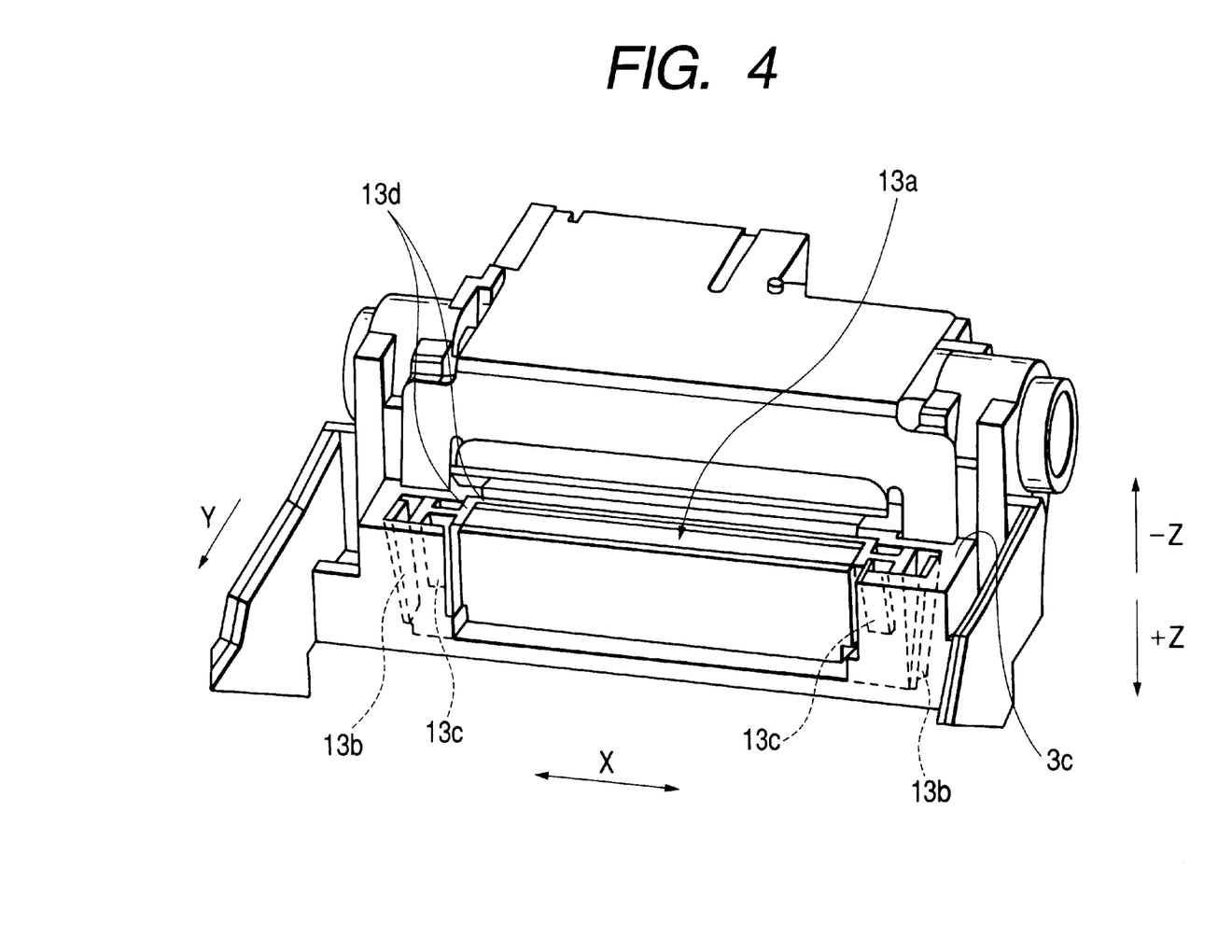
FIG. 4 is a partial fragmental perspective view of the carriage shown in FIG. 2B.

FIG. 4 is a partial fragmental perspective view showing of the carriage shown in FIG. 2B.

A set of long side direction supporting springs 13b which are opposed to each other are provided on side surfaces of short sides of the card edge connector 13 so that tip ends of the springs 13b abut against the inner walls of the connector holding portion 3c to apply an elastic force to the latter. Since both long side direction supporting springs 13b have the same elastic function, in a condition that the recording head 1 is not attached, the card edge connector 13 is held at a substantially center position with respect to the connector holding portion 3c in the X direction. Thus, the card edge connector 13 can be moved in any directions within the XY plane including a surface in which the card insertion opening 13a is provided.

In the vicinity of both side surfaces of the long sides of the card edge connector 13, two sets of short side direction supporting springs 13c which are opposed to each other are provided so that tip ends of these springs 13c abut against the inner walls of the connector holding portion 3c to apply an elastic force to the latter. Since the four short side direction supporting springs 13b have the same elastic function, in the condition that the recording head 1 is not attached, the card edge connector 13 is held at a substantially center position with respect to the connector holding portion 3c in the Y direction to be held so that the long side directions become substantially parallel to the X direction. Further, since the short side direction supporting springs 13b are contacted with the connector holding portion 3c at an upper part in the vicinity of the card insertion opening 13a of the card edge connector 13, the card insertion opening 13a is stably held at a substantially central position of the connector holding portion 3c with respect to the Y direction.

Incidentally, the supporting springs 13b and 13c are not limited to the coil springs, but, as shown in FIG. 4, plate-shaped springs may be used to achieve the same effect.

In FIGS. 3A to 3C, when the card edge connector 13 is displaced up to a position where the long side direction supporting springs 13b and the short side direction supporting springs 13c are flexed by about 0.6 mm, the housing of the card edge connector 13 abuts against the inner wall of the connector holding portion 3c, thereby preventing the springs from being further flexed.

When the recording head 1 is attached to the carriage 3, load acting in +Z direction is applied to the card edge connector 13 by the card edge substrate 14 inserted into the card edge connector. However, since the housing of the card edge connector 13 abuts against a lower side fixing portion 13f provided on a bottom surface of the connector holding portion 3c, the card edge connector is fixed in the +Z direction. Consequently, the card edge substrate 14 can be inserted into the card edge connector 13 in opposition to the load acting in the +Z direction.

Further, when the recording head 1 is dismounted from the carriage 3, load acting in −Z direction is applied to the card edge connector by the fastening force between the card edge substrate 14 and the card edge connector 13. However, since the tip ends of the long side direction supporting springs 13b are arranged to extend below an upper side fixing portion 13e provided at an upper part of the connector holding portion 3c, when the long side direction supporting springs 13b abut against the upper side fixing portion 13e, the card edge connector 13 is also fixed in the −Z direction. Consequently, when the recording head 1 is dismounted from the carriage 3, the card edge connector 13 is prevented from being driven out of the connector holding portion 3c.

In this way, these fixing portions 13e and 13f constitute a connector fixing portion for fixing the card edge connector 13 with respect to the mounting and dismounting directions for the card edge substrate 14, and, according to such a connector fixing portion, since the card edge connector 13 is held positively when the recording head 1 is mounted and dismounted with respect to the carriage 3, the user's operability regarding the mounting/dismounting of the recording head can be more stabilized. Further, so long as the connector fixing portion is provided, after the card edge connector 13 is once assembled to the connector holding portion 3c, since the card edge connector 13 is not driven out of the connector holding portion 3c accidentally, the operability for assembling the card edge connector 13 to the connector holding portion 3c is enhanced.

The long side direction supporting springs 13b and the short side direction supporting springs 13c each may have an elastic force sufficient to hold the card edge connector 13 at the substantially center position of the connector holding portion 3c, and it is desirable that the elastic force of each spring be about 1 N.

While the user uses the recording apparatus, since the recording head 1 is always attached to the carriage, a condition that the card edge connector 13 is displaced from the center of the connector holding portion 3c and the springs 13b and 13c are deformed elastically is maintained. In many instances, this condition continues for a long term such as several years. Further, there is the possibility that the recording apparatus be installed under a high temperature environment such as a closed interior of a motor vehicle in the above-mentioned condition. After the recording apparatus is installed in this way, when the recording head 1 is dismounted, the card edge connector 13 must be held at the substantially center position of the connector holding portion 3c to achieve the same performance as the initial performance. To this end, the long side direction supporting springs 13b and the short side direction supporting springs 13c must be formed with material and configuration which prevent permanent deformation of the springs, and, it is desirable that the springs be formed from metal such as stainless steel or phosphorus bronze in order to further enhance the reliability.

In the illustrated embodiment, since the inner dimension of the carriage is greater than the outer dimension of the recording head 1 by about 1 mm, when the recording head 1 is inserted into the carriage 3 from above, the recording head 1 is held within the carriage with some play. When the insertion is further continued, the recording head 1 is inserted up to a position where the card edge substrate 14 abuts against the card insertion opening 13a of the card edge connector 13. In this case, the relative position between the card edge substrate 14 and the card edge connector 13 may be deviated in the X and Y directions. However, an amount of the deviation is smaller than 0.5 mm which is half of 1 mm (play amount between the carriage 3 and the recording head 1), and the direction of the long sides of the card edge connector 13 is held to be substantially parallel to the X direction. Thus, the tip end of the card edge substrate 14 is guided by the chamfer 13d of 0.5 mm or more provided on the card insertion opening 13a, with the result that the substrate is introduced into the card insertion opening 13a of the card edge connector 13 smoothly.

In this case, the X position positioning spring and Y direction positioning spring (both not shown) provided on the carriage 3 urge the X direction positioning surface 1a and the Y direction positioning surface 1b of the recording head 1 toward the positioning surfaces 3a and 3b of the carriage 3 and further the Z direction positioning spring (not shown) urges the recording head 1 against the carriage 3 in the Z direction, with the result that the attachment of the recording head 1 to the carriage 3 is completed.

In a condition that the attachment of the recording head 1 is completed, the positioning surfaces of the recording head 1 and the carriage 3 abut against each other and, at the same time, the card edge substrate 14 is fitted into the card edge connector 13, but, dimensional tolerance between the carriage 3 and the card edge connector 13 and dimensional tolerance between the recording head 1 and the card edge substrate 14 are absorbed by the displacement of the card edge connector 13 within the connector holding portion 3c. As mentioned above, since the total of such dimensional tolerances is smaller than 0.5 mm which is half of 1 mm (play amount between the carriage 3 and recording head 1) and, on the other hand, the card edge connector 13 can be displaced within the connector holding portion 3c by about 0.6 mm, the positioning between the recording head 1 and the carriage 3 is not obstructed by the fitting between the card edge connector 13 and the card edge substrate 14, thereby achieving high accurate positioning between the recording head 1 and the carriage 3. Further, since the displacement of the card edge connector 13 is absorbed by flexion of the flexible cable 12, any stress does not act on the card edge substrate 14 and the card edge connector 13, thereby obtaining electrical connection having high reliability.

According to the illustrated arrangement, since the attachment of the recording head 1 to the carriage 3 and the fitting of the card edge substrate 14 into the card edge connector 13 are performed simultaneously, the user's attaching operation is facilitated. Further, in the recording apparatus according to the illustrated embodiment, only by pushing the card edge connector 13 to which the flexible cable 12 was soldered from above until the tip ends of the long side direction supporting springs 13b enter below the top surface of the connector holding portion 3c, since the mounting of the card edge connector 13 to the connector holding portion 3c is completed, the assembling operation in the manufacture is facilitated.

In the card edge connector 13 according to the illustrated embodiment, electrical contact terminals having 40 poles (not shown) are arranged in a line in the long side direction with a pitch of 0.6 mm. The dimension of the connector holding portion 3c including the card edge connector 13 is about 41 mm (X direction) ×about 6.5 mm (Y direction) ×about 8.5 mm (Z direction). This volume is about half of the volume of a conventional structure of pressure abutment connector type in which electrical contact terminals of 40 poles are arranged.

On the other hand, in the conventional structure of the pressure abutment connector type, other than the pressure abutment connector itself, a spring for generating a pressure abutment force of 30 N or more is needed, and further, a space in which ribs are provided for reinforcing the carriage and the recording head on which the pressure abutment force acts is also needed.

From these reasons, in the illustrated embodiment, the volume required for the arrangement for the electrical connection between the recording head and the recording apparatus is reduced to ⅓ or less of the volume of the conventional structure adopting the pressure abutment system.

As mentioned above, according to the recording apparatus of the illustrated embodiment, since the card edge connector 13 is held at the substantially center of the connector holding portion 3c before the recording head 1 is mounted to the carriage 3, when the recording head 1 tries to be mounted to the carriage 3, the positional deviation of the card edge connector 13 with respect to the card edge substrate 14 is small. An amount of such positional deviation is, at the most, within a range where the card edge substrate 14 can be inserted into the card edge connector 13 through the insertion opening 13a. Thus, the user can attach the recording head 1 to the carriage 3 only by a simple operation for pushing the recording head 1 into the carriage 3.

Further, after such attachment is completed, the card edge connector 13 is displaced within the connector holding portion 3c, and dimensional tolerance regarding the attachment of the card edge substrate to the recording head 1 and dimensional tolerance regarding the attachment of the card edge connector 13 to the carriage are absorbed. Thus, in the recording apparatus according to the illustrated embodiment, high reliable electrical connection provided by the card edge connector 13 and the card edge substrate 14 and high accurate positioning between the recording head 1 and the carriage 3 are compatible.

Incidentally, in the illustrated embodiment, while an example that the long side direction supporting springs 13b and the short side direction supporting springs 13c are provided in the housing of the card edge connector 13 was explained, when these springs are provided on the inner wall of the connector holding portion 3c and are elastically contacted with the housing of the card edge connector 13, the similar effect can be achieved.

Further, in the illustrated embodiment, while an example that the card edge connector 13 is held by the connector holding portion 3c provided on the carriage 3 and the card edge substrate 14 is provided on the recording head 1 was explained, when the card edge substrate 14 is provided on the carriage 3 and the card edge connector 13 is held by a connector holding portion 1c provided on the recording head 1, the similar effect can be achieved.

Further, also in a recording apparatus having an arrangement in which a plurality of recording heads are held on a carriage, when a plurality of card edge connectors for transmitting drive signals to the respective recording heads are held so that the connectors can be moved within connector holding portions provided on the carriage, the similar effect can be achieved.

In the illustrated embodiment, as can be understood from FIGS. 1 and 2B, it is designed so that the carriage 3 performs reciprocal scanning in the X direction along which the long sides of the card edge connector 13 extend. However, the installation direction of the card edge connector 13 with respect to the scanning direction of the carriage 3 is not limited to the above-mentioned arrangement, the card edge connector 13 may be installed on the carriage 3 so that the scanning direction of the carriage 3 coincides with a direction along which the short sides of the card edge connector 13 extend.

As mentioned above, in the recording apparatus according to the illustrated embodiment, since the head holding member or the recording head has the connector holding portion for supporting the card edge connector through the elastic member so that the card edge connector can be moved in two directions perpendicular to the mounting/dismounting direction of the card edge substrate, high reliable electrical connection achieved by the card edge connector and the card edge substrate and high accurate positioning between the recording head and the head holding member are compatible, and, further, the recording head can easily be attached to the head holding member.

What is claimed is:

1. A recording apparatus comprising:
   a head holding member for detachably holding a recording head to which a card edge substrate having a plurality of electrical contacts to which drive signals are transmitted is attached, said recording head performing a recording operation on the basis of the drive signals; and
   a card edge connector having a plurality of electrical contact terminals connected to said electrical contacts of said card edge substrate, respectively, and attached to said head holding member,
   wherein
   said head holding member has a connector holding portion for supporting said card edge connector through an elastic member so that said card edge connector can be moved in two directions perpendicular to mounting and dismounting directions of said card edge substrate with respect to said card edge connector.

2. A recording apparatus according to claim 1, wherein said connector holding portion has a connector fixing portion for fixing said card edge connector with respect to the mounting and dismounting directions of said card edge substrate.

3. A recording apparatus according to claim 1, wherein said card edge connector is provided with an insertion opening into which said card edge substrate is inserted, and a surface to which said insertion opening of said card edge connector is opened is configured as a rectangular shape having a pair of relatively short sides and a pair of relatively long sides, and said connector holding portion is designed to support said card edge connector so that said card edge connector can be moved in two directions along which said short sides and said long sides extend.

4. A recording apparatus according to claim 3, wherein said elastic member comprises a set of long side direction supporting springs provided to be opposed to each other at side surfaces of said card edge connector including said short sides, respectively, and adapted to support said card edge connector so that said card edge connector can be displaced in the direction along which said long sides extend, and two sets of short side direction supporting springs provided to be opposed to each other at side surfaces of said card edge connector including said long sides, respectively, and adapted to support said card edge connector so that said card edge connector can be displaced in the direction along which said short sides extend.

5. A recording apparatus according to claim 4, wherein each of said supporting springs is provided on said card edge connector.

6. A recording apparatus according to claim 4, wherein each of said supporting springs is provided on said connector holding portion.

7. A recording apparatus according to claim 4, wherein said short side direction supporting springs are disposed at said side surface of said card edge connector in the vicinity of the surface to which said insertion opening is opened.

8. A recording apparatus according to claim 3, wherein an amount of deviation of said recording head with respect to said head holding member is smaller than 0.5 mm, and a movable amount of said card edge connector with respect to said connector holding portion is greater than 0.5 mm in the directions along which said long sides and said short sides extend, and edges of said insertion opening of said card edge connector are chamfered as chamfers of 0.5 mm or more.

9. A recording apparatus according to claim 3, further comprising scanning means for performing reciprocal scanning of said head holding member in a direction substantially parallel to the direction along which said long sides or said short sides of said card edge connector extend.

10. A recording apparatus comprising:
    a head holding member for detachably holding a recording head to which a card edge connector having a plurality of electrical contact terminals to which drive signals are transmitted is attached; and
    a card edge substrate having a plurality of electrical contacts connected to said plurality of electrical contact terminals of said card edge connector, respectively, and attached to said head holding member,
    wherein
    said recording head has a connector holding portion for supporting said card edge connector through an elastic member so that said card edge connector can be moved in two directions perpendicular to mounting and dismounting directions of said card edge substrate with respect to said card edge connector.

11. A recording apparatus according to claim 10, wherein said connector holding portion has a connector fixing portion for fixing said card edge connector with respect to the mounting and dismounting directions of said card edge substrate.

12. A recording apparatus according to claim 10, wherein said card edge connector is provided with an insertion opening into which said card edge substrate is inserted, and a surface to which said insertion opening of said card edge connector is opened is configured as a rectangular shape having a pair of relatively short sides and a pair of relatively long sides, and said connector holding portion is designed to support said card edge connector so that said card edge connector can be moved in two directions along which said short sides and said long sides extend.

13. A recording apparatus according to claim 12, wherein said elastic member comprises a set of long side direction supporting springs provided to be opposed to each other at side surfaces of said card edge connector including said short sides, respectively, and adapted to support said card edge connector so that said card edge connector can be displaced in the direction along which said long sides extend, and two sets of short side direction supporting springs provided to be opposed to each other at side surfaces of said card edge connector including said long sides, respectively, and adapted to support said card edge connector so that said card edge connector can be displaced in the direction along which said short sides extend.

14. A recording apparatus according to claim 13, wherein each of said supporting springs is provided on said card edge connector.

15. A recording apparatus according to claim 13, wherein each of said supporting springs is provided on said connector holding portion.

16. A recording apparatus according to claim 13, wherein said short side direction supporting springs are disposed at said side surface of said card edge connector in the vicinity of the surface to which said insertion opening is opened.

17. A recording apparatus according to claim 12, wherein an amount of deviation of said recording head with respect to said head holding member is smaller than 0.5 mm, and a movable amount of said card edge connector with respect to said connector holding portion is greater than 0.5 mm in the directions along which said long sides and said short sides extend, and opening edges of said insertion opening of said card edge connector are chamfered as chamfers of 0.5 mm or more.

18. A recording apparatus according to claim 12, further comprising scanning means for performing reciprocal scanning of said head holding member in a direction substantially parallel to the direction along which long sides or short sides of said card edge connector extend.

* * * * *

UNITED STATES PATENT AND TRADEMARK OFFICE
CERTIFICATE OF CORRECTION

PATENT NO. : 6,733,317 B2
DATED : May 11, 2004
INVENTOR(S) : Sato

It is certified that error appears in the above-identified patent and that said Letters Patent is hereby corrected as shown below:

Column 1,
Line 48, "kind" should read -- kinds --.

Column 3,
Line 38, "fragmental" should read -- fragmented --.

Column 4,
Line 21, "substrate 1" should read -- substrate 11 --.
Line 65, "sub" should read -- sub- --.

Column 5,
Line 11, "are" should read -- be --.
Line 44, "fragmental" should read -- fragmented --.

Column 8,
Line 35, "From" should read -- Due to --.

Signed and Sealed this

Twenty-eighth Day of December, 2004

JON W. DUDAS
*Director of the United States Patent and Trademark Office*